(No Model.) 2 Sheets—Sheet 1.
F. BAUER.
COMBINED FEED WATER HEATER, OIL EXTRACTOR, AND WATER PURIFIER.
No. 468,232. Patented Feb. 2, 1892.
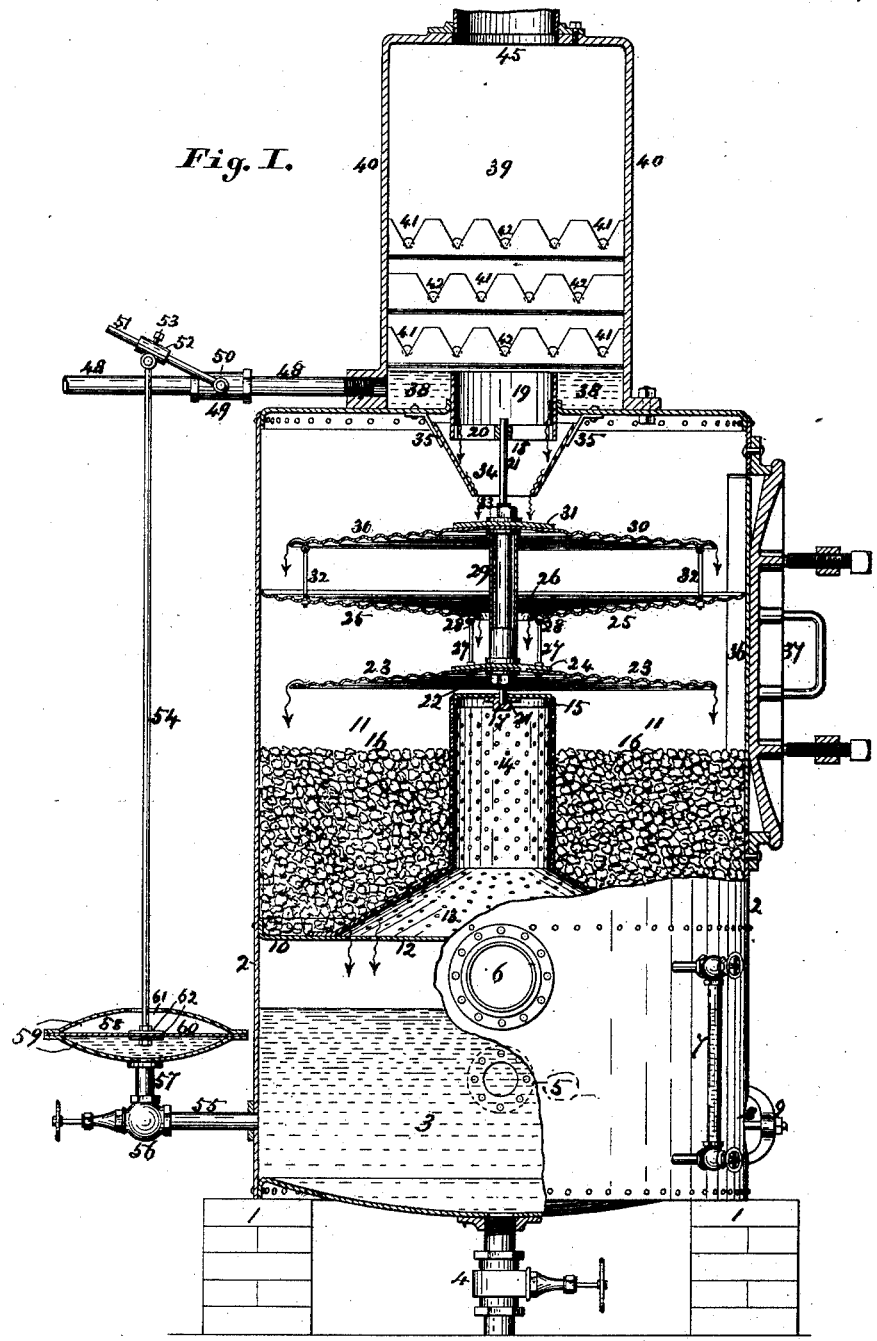
Fig. I.
Attest:
George E. Cruse,
Harry F. Rohrer
Inventor:
Ferdinand Bauer.
By Knight Bros.
Att'ys (No Model.) 2 Sheets—Sheet 2.
F. BAUER.
COMBINED FEED WATER HEATER, OIL EXTRACTOR, AND WATER PURIFIER.
No. 468,232. Patented Feb. 2, 1892.
*Fig. II.*
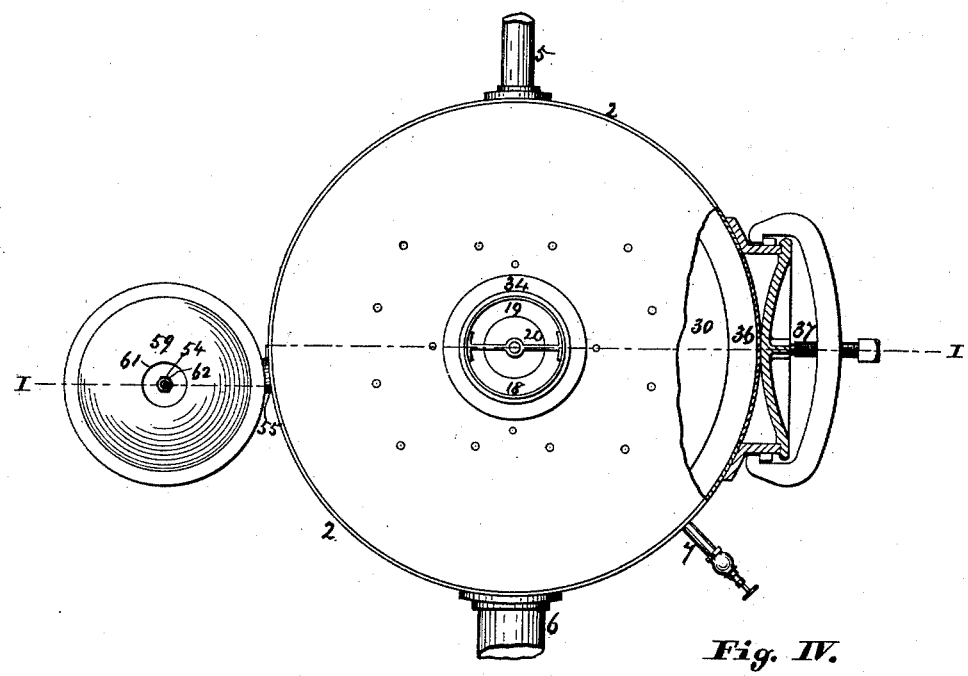
*Fig. III.*
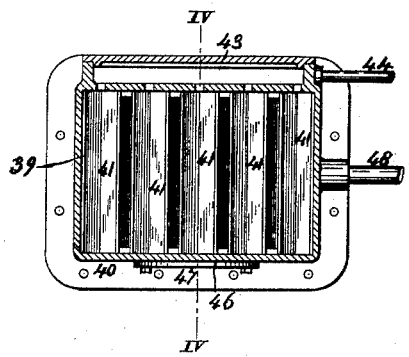
*Fig. IV.*
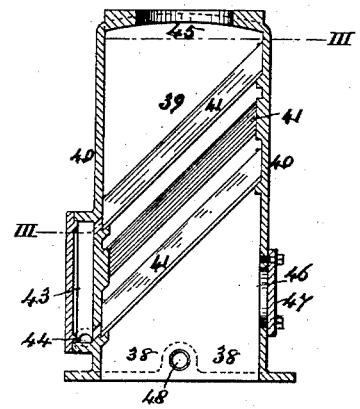
*Fig. V.*
Attest:
George E. Cruse
Harry F. Arner
Inventor:
Ferdinand Bauer
By Knight Bro's.
Att'ys.

UNITED STATES PATENT OFFICE.

FERDINAND BAUER, OF ST. LOUIS, MISSOURI.

COMBINED FEED-WATER HEATER, OIL-EXTRACTOR, AND WATER-PURIFIER.

SPECIFICATION forming part of Letters Patent No. 468,232, dated February 2, 1892.

Application filed November 28, 1891. Serial No. 413,423. (No model.)

*To all whom it may concern:*

Be it known that I, FERDINAND BAUER, of the city of St. Louis, in the State of Missouri, have invented a certain new and useful Improvement in a Combined Feed-Water Heater, Oil-Extractor, and Water-Purifier, of which the following is a full, clear, and exact description, reference being had to the accompanying drawings, forming part of this specification.

This invention relates to devices for extracting oil, lime, and other obnoxious ingredients from exhaust-steam and from the feed-water with which said exhaust-steam is made to combine and to said combination for the simultaneous purpose of condensing said exhaust-steam and heating said feed-water.

Figure I is a vertical section taken on the stagger line I I, Fig. II, with a vertical section of the combined elevated water-tank and exhaust-steam chamber, and shows the hydrant-supply with its automatic check-valve, the oil-traps, the reheating and repurifying filter-chamber, the rotatable corrugated sediment-disks in said chamber, and the purified hot-feed-water tank. Fig. II is a top view minus the combined elevated water-tank and exhaust-steam chamber with its hydrant-supply pipe, with part broken away to show the interior of the reheating and repurifying chamber and the upper sediment-disk. Fig. III is a horizontal section taken on the stagger line III III, Fig. IV, and shows the oil-traps and their dry reservoir. Fig. IV is a vertical section taken on the line IV IV, Fig. III; and Fig. V is a vertical transverse section of one of the oil-traps.

Referring to the drawings, 1 represents the foundation-wall. 2 is the main cylinder, that rests on said wall, in the base of which cylinder is the hot purified feed-water reservoir 3. A blow-off pipe 4 connects with the bottom of said reservoir and is used for periodic cleansing purposes.

5 represents the feed-water-supply pipe that feeds the boiler, and 6 is the overflow and exhaust outlet. A vertical glass-tube indicator-gage 7 outside said cylinder connects with the interior thereof to register the depth of water in the reservoir. A hand-hole 8 through the cylinder, near its base, provides means for entrance into the reservoir for cleaning out the same, and said opening is closed by the bail screw-stopper 9.

10 represents a circle-plate ceiling above the reservoir, whose peripheral flange is bolted or riveted to the main cylinder, and the circle-plate also constitutes the floor of the combined filter, reheating, and repurifying chamber 11. The said circle-plate has a large circular central opening 12, extending, preferably, across about three-quarters of its diameter, and around said opening the foot-flange of the perforate cone 13 is bolted or riveted, which cone is surmounted by and secured to the perforate tube 14, and said tube is covered by the cap 15. 16 represents filtrant of charcoal or other suitable material, which rests upon said circle-plate or floor and against said perforate cone and tube. A journal-socket box 17 is secured beneath the perforate center of the cap 15 of said perforate tube. The top plate of the main cylinder has a central opening 18, and the flanged edges of said plate around said opening are riveted or otherwise secured to the overflow-pipe 19, whose functions will be hereinafter specified.

20 represents a cross-center journal-bearing bar, whose flanged ends are secured within the bottom of said overflow-pipe and in whose central journal-bearing the top of the vertical rotatable rod 21 has its upper bearings, its lower bearings being in the journal-socket box 17. A screw-nut 22 is screw-seated on said rod near its lower end, and on its surmounting washer a large centrally-perforated corrugated disk 23 is seated, extending, preferably, across about nine-tenths of the diameter of the main cylinder, which incloses the reheating and repurifying chamber. Through the central perforation in said corrugated disk the rotatable rod 21 ascends, and the upper surface of said disk is slightly convex, so as to constitute a gentle water shed and ripple over its corrugated surface.

24 represents a large centrally-perforated washer-plate that is seated on said rod, and, having a corresponding dish, fits close to the smooth center part of said corrugated plate on which it lies.

25 represents the major intermediate corrugated disk, which extends almost clear from side to side of said main cylinder, merely allowing room for its rotation when cleaning.

Unlike the disk 23 the disk 25 is concave on its upper side, so that the water shed thereon ripples over its corrugated surface toward and drips through the circular opening 26 down onto the broad washer and corrugated disk below. The said disk 25 is supported by the pendent rods 27, which hang pivoted at 28 from the corrugated disk 25, and their screw-points pass through perforations in the large washer 24 and in the corrugated disk 23 until the shoulder-nuts on said rods rest on said washers, and the rods are secured beneath by screw-nuts.

29 represents a thimble-tube flanged outward at each end, and said thimble is seated around the enlarged middle part of the vertical rotatable rod 21. The lower flanged end of said thimble is seated on the large washer-plate 24, and on its upper flanged end is seated the upper corrugated disk 30, which is a duplicate of the disk 23, its upper surface being alike, convex, and its perforate center is seated on the same rod 21. A broad centrally-perforated washer-plate 31 is also seated on said rod and rests on the flat center of said corrugated disk. Pendent rods 32 hang pivoted from the under side of the corrugated disk 30 and pass through the disks 25, to which they are secured by screw-nuts. Above the small washer that surmounts the broad washer 31 a nut 33 screws down on its threaded seat on the rod 21 and firmly holds the three corrugated disks in their respective positions. A conical funnel 34, held pendent by hanger-flanges 35, that are secured to the head of the main cylinder, receives the overflow drip of water and the exhaust-steam that comes to it *via* the overflow-pipe 19 and precipitates the same into the reheating and repurifying chamber and on said corrugated disks.

36 represents a man-hole in the side of the main cylinder, which is inclosed by the set-screw bail-cap 37.

38 represents an elevated water-reservoir, which is combined in the same inclosure with the exhaust-steam chamber 39, both being inclosed in the surmounting cylinder 40, which cylinder has a steam-tight bolted joint on the head of the main cylinder.

41 represents grease or oil traps, which are constructed of a system of sharply-inclined troughs, which are located in alternating staggered tiers within said exhaust-steam chamber to trap the grease or oil 42 in said exhaust-steam chamber and run it into the oil-reservoir 43, from which it passes *via* the discharge-pipe 44 into any receptacle that may be set to receive it.

45 represents the exhaust-steam pipe, that enters at the top of the surmounting cylinder. 46 is the hand-hole through said cylinder, that provides access thereto for cleaning out the same, and 47 is the cover, which, by means of its set-screws, secures a steam-tight joint around the same.

48 represents the hydrant-pipe, that supplies water to the elevated tank, and, after heating and purifying the same, supplies the feed-water tank 3. 49 represents a union-joint in said hydrant-pipe, in which joint is the check-valve 50, and 51 is the lever that operates said valve. 52 represents the adjustable holder, that is mounted on said operating-lever, and which is secured in its adjusted position on said lever by the set-screw 53. 54 represents the actuating-rod, which hangs pendent from its pivoted connection to said adjustable holder.

A horizontal tube 55 connects with the hot purified feed-water reservoir 3 and projects sufficiently in front of the main cylinder for the water within it to exercise its automatic function, and said tube terminates in that direction in a three-way globe-joint 56, in which a check-valve works, by which valve the automaton can be either checked or stopped in its operation. A vertical tube 57 rises from said three-way valve-joint and enters the globe-chamber 58, which is inclosed within the concave plates 59. A diaphragm 60, preferably of rubber, but which may be of thin elastic metal, is stretched across and nipped between the joint-flanges of said concave plates.

The lower end of the aforesaid actuating-rod 54 is screw-threaded and passes through the center opening 61 in the upper concave plate 59 and through a center perforation in the diaphragm 60, and is firmly secured to said diaphragm by the flanged screw-nuts 62, that are seated on said screw-tip of said rod above and below said diaphragm and securely attach it thereto.

The operation of the device is as follows: The exhaust-steam enters the chamber 39, in which are the oil-traps 41 and the elevated reservoir 38. It will be seen that this part of my invention is an improvement on my previous invention for which a patent was issued to me on July 21, 1891, No. 456,464. I have in this invention, unlike in my former device, combined the sole hydrant-supply in the elevated reservoir 38 in close proximity to the oil-traps within the same steam-exhaust chamber in which said oil-traps are located. I thereby more effectually and rapidly combine twofold advantages that are pre-eminent requirements of this invention—namely, the rapid transfer of heat from the exhaust-steam to the feed-water, thereby both heating it for use and thereby bringing it into a favorable condition before entering on its sedimentary action for the deposit, as hereinafter specified, of the lime and other obnoxious ingredients in the water, and at the same time by said mutually-beneficial interchange by the sudden reduction of temperature of the exhaust-steam while it is yet in the vicinity of the oil-traps the oil and grease in the exhaust-steam, which have been etherealized by the superheated steam when said steam has quickly imparted much of its heat to the hydrant-water in the reservoir by the fall in temperature, said oil and grease materialize and are rapidly precipitated into the system of staggered traps, and to which they have a capillary attraction and down which trap-troughs 41 the said oil runs into the oil-reservoir 43, from which, through the discharge-pipe 44, it is conveyed into any required depository. The thus partially-heated water in the elevated reservoir 38 continuously overflows around the rim of the pipe 19 in an attenuated sheet or sprinkle and strikes on the incline of the funnel 34, thereby still further separating the drops and presenting increased surfaces to the heating of the only partially-cooled exhaust-steam, which continuously forces down in contact with the spray, quickly reheating the same. The spray, which has now entered the reheating and repurifying chamber within the main cylinder 2, drips on and ripples over the convex surface of the upper corrugated plate 30, from which it drips all around the periphery of said plate onto the concave surface of the major intermediate corrugated disk 25, and after rippling over its corrugations it falls in a spray through the circular opening 26 onto the convex upper surface of the lower corrugated plate 23, and after rippling over its corrugations it drops in spray from the periphery of said plate to the filtrant 16 in the lower part of said chamber. It will be seen that during the whole rippling course of the feed-water spray over said corrugated alternately convex and concave plates its minutely-divided globules are intimately subjected to the remaining heat of the exhaust-steam, which is following up and playing around them. It will also be seen that the corrugations of said plates provide just the depositories required for trapping the lime and other noxious sediment that, as well as the oil and grease trapped above, need to be eliminated from the feed-water. The thus purified and heated feed-water, lastly, is still further purified in passing through the filtrant 16, from which it percolates through the perforate cone and tube 13 and 14 and drips into the reservoir 3 in the base, from which reservoir it is taken via the feed-water-supply pipe 5 to the boiler or boilers that it supplies. The height of the water in the reservoir 3, it will be seen, by its simultaneous consequent action on the diaphragm 60 in the globe-chamber 58 automatically works the lever of the hydrant check-valve 50 above to accordingly increase or diminish the supply, as the case may be, to keep an adequate supply of feed-water in the reservoir 3 to keep up the required supply. To respectively increase or diminish the capacity of said check-valve 50 it will be seen that the holder 52 is arranged to be shifted, respectively, farther down or up, as the case may be, on the operating-lever 51, where it is fastened by the set-screw 53.

The advantages of this device may be better understood if it is taken into consideration that the earlier in the process of the device the exhaust-steam can be slightly cooled, and, on the directly-opposite hand, the earlier in said process the feed-water can be heated, in both cases from exactly opposite reasons, the exhaust-steam, on the one hand, more quickly precipitates its obnoxious oil in the traps and the feed-water more quickly deposits its lime and other obnoxious sediment amid the corrugations of the sediment-trap plates. When it is required to clean said corrugated plates or to clean the filter, the screw bail-cap 37 is removed from the manhole 36. It will also be seen that when it is required to clean the corrugated plates the operator can turn any part thereof facing said man-hole by the movement of the rotatable pedestal, on which they are mounted, so as in sections to conveniently clean the whole circuit of said plates. The hand-holes 8 and 46 when their covers are removed also provide access, respectively, to the feed-water tank 3 and to the combined elevated hydrant-tank 38 and the exhaust-steam chamber 39 when it is required to clean the same.

I claim as my invention—

1. In a combined feed-water heater, oil-extractor, and water-purifier, the combination of the elevated water-tank, the exhaust-steam chamber in the same inclosure above said tank, the system of inclined troughs that constitute oil-traps in said chamber, and the drip-reservoir that receives said oil from said traps, substantially as described.

2. In a combined feed-water heater, oil-extractor, and water-purifier, the combination of the combined elevated water-tank and exhaust-steam chamber, the hydrant-pipe that supplies water to said tank, the system of inclined troughs that constitute oil-traps in said chamber, the oil-reservoir that receives the drip from said traps, the overflow-pipe in said water-tank, that discharges the steam-heated water and condensed exhaust-steam, and the repurifier-chamber into which said product is discharged, substantially as described.

3. In a combined feed-water heater, oil-extractor, and water-purifier, the combination of the combined elevated water-tank and exhaust-steam chamber, the system of staggered inclined troughs that constitute oil-traps in said chamber, the oil-reservoir that receives the drip from said traps, the overflow-pipe in said water-tank, the inverted-cone dash spray against which the overflow drip of the steam-heated water and condensed steam dashes in its fall, and the underlying main cylinder in which the further heating and repurification of the feed-water are effected, substantially as described.

4. In a combined feed-water heater, oil-extractor, and water-purifier, the combination of the combined elevated water-tank and exhaust-steam chamber, the system of inclined oil-traps, the overflow-pipe, the inverted-cone spray-tube, the main underlying cylinder, the initial convex corrugated disk on which the heated water and condensed steam drip and deposit impurities, the concave corrugated pan into which said water drips from the initial disk and settles, and the final corrugated concave disk on which said water percolates from the center of said pan, substantially as described.

5. In a combined feed-water heater, oil-extractor, and water-purifier, the combination of the surmounting combined water-heater and oil-extractor, the exhaust-steam-supply pipe, the overflow-pipe, the inverted conical spray-tube, the main underlying cylinder, the repurifying-chamber that said cylinder incloses, the surmounting convex corrugated disk, the intervening concave corrugated disk, the underlying convex corrugated disk, the filter-floor in said cylinder, the perforated cone on said floor, the perforated pipe that surmounts said cone, and the filtrant deposited on said floor and around said perforated cone and pipe, substantially as described.

6. In a combined feed-water heater, oil-extractor, and water-purifier, the combination of the surmounting combined oil-extractor and initial feed-water heater, the underlying cylinder, the repurifying and reheating chamber within said cylinder, the overflow and spray tubes through which the water drips to said chamber, the convex and concave corrugated disks through which the water passes and on and in which it is reheated and repurified, the filtrant floor, the percolating-funnel tube, the filtrant in said chamber, and the screw-tightened man-hole that gives access to said chamber, substantially as described.

7. In a combined feed-water heater, oil-extractor, and water-purifier, the combination of the surmounting combined oil-extractor and initial feed-water heater, the underlying cylinder, the reheating and repurifying chamber in said cylinder, the overflow and spray drip into said chamber, the rotatably-mounted corrugated spray-purifying disks, the filtrant floor and percolating-funnel, the filtrant thereon deposited, the base extension of said main cylinder, and the hot purified feed-water tank within said base extension of said cylinder, substantially as described.

8. In a combined feed-water heater, oil-extractor, and water-purifier, the combination of the combined elevated water-tank and oil-extracting chamber, the hydrant-pipe that supplies said tank with water, the union-pipe jointed to said hydrant-pipe, the check-valve in said union-pipe, the underlying reheating and repurifying cylinder-chamber and filter, the base-tank that holds the hot condensed steam and purified feed-water, the gage-pipe that communicates with said tank, the surmounting gage-drum that connects with said gage-pipe, the float in said drum, the elevator-rod secured to said float, the T-cap tube pivoted to the top of said rod, the lever that operates the check-valve in said union-joint of said hydrant-pipe, the said lever being seated in said pivoted T-cap tube, and the set-screw that adjusts the attachment to said lever, the said gage device arranged to increase the opening of the check-valve in the hydrant-pipe when the water lowers in the feed-water tank, substantially as described.

9. In a combined feed-water heater, oil-extractor, and water-purifier, the combination of the surmounting combined water-tank, oil-extractor, and initial feed-water heater, the underlying cylinder, the reheating and repurifying chamber in said cylinder, the overflow and spray drip into said chamber, the rotary pedestal in said chamber, the corrugated convex and concave purifying-disks mounted on said pedestal, the filtrant-floor, the percolating-funnel and filtrant deposited thereon, the basement hot purified feed-water tank, and the gage-indicator glass tube that connects with said tank, substantially as described.

10. In a combined feed-water heater, oil-extractor, and water-purifier, the combination of the surmounting oil-extractor, water-tank, and initial feed-water heater, the underlying cylinder, the reheating and repurifying chamber in said cylinder, the rotary mounted corrugated spray-purifying disks in said chamber, the filter with its percolated funnel and floor, the base hot purified feed-water tank, the feed-pipe, the overflow and exhaust outlet pipe, the blow-off pipe, and the cock that operates the valve in said pipe, substantially as described.

11. In a combined feed-water heater, oil-extractor, and water-purifier, the combination of the elevated water-tank, the exhaust-steam chamber in the same inclosure above said tank, the system of inclined troughs that constitute oil-traps in said chamber, the drip-reservoir, the discharge-pipe from said reservoir, the said combined elevated tank and exhaust-steam chamber provided with a hand-hole for cleaning out the same, and the cover of said hand-hole, substantially as described.

12. In a combined feed-water heater, oil-extractor, and water-purifier, the combination of the combined oil-extractor and initial feed-water heater, the underlying cylinder, the reheating and repurifying chamber in said cylinder, the filter-floor, the perforated funnel and filtrant in said chamber, the base hot purified feed-water tank in said cylinder, the said tank provided with the hand-hole for cleaning, and the cover of said hand-hole, substantially as described.

FERDINAND BAUER.

In presence of—
BENJN. A. KNIGHT,
SAML. KNIGHT.